Dec. 14, 1954  O. BROWN  2,696,955
CROSS-WIND LANDING AND LAUNCHING SYSTEM
Filed April 27, 1948  5 Sheets-Sheet 1

*Owen Brown*
INVENTOR.

Dec. 14, 1954            O. BROWN            2,696,955

CROSS-WIND LANDING AND LAUNCHING SYSTEM

Filed April 27, 1948            5 Sheets-Sheet 3

INVENTOR.

Dec. 14, 1954   O. BROWN   2,696,955
CROSS-WIND LANDING AND LAUNCHING SYSTEM
Filed April 27, 1948   5 Sheets-Sheet 4

INVENTOR.

Dec. 14, 1954   O. BROWN   2,696,955
CROSS-WIND LANDING AND LAUNCHING SYSTEM
Filed April 27, 1948   5 Sheets-Sheet 5

*Owen Brown*
INVENTOR.

United States Patent Office
2,696,955
Patented Dec. 14, 1954

2,696,955
CROSS-WIND LANDING AND LAUNCHING SYSTEM

Owen Brown, Los Angeles, Calif.

Application April 27, 1948, Serial No. 23,645

18 Claims. (Cl. 244—63)

This invention relates to aircraft, to aircraft landing and launching surfaces, to aircraft landing, launching and towing facilities, and to certain preferred methods whereby such craft, such surfaces, and such facilities may be best utilized.

More specifically, it relates to apparatus by the use of which various flying devices—especially powered airplanes and towable gliders—can be safely, surely, and largely automatically landed and launched under variable weather conditions. It is particularly applicable to the landing and the launching of such devices on and from one-way airstrips, proposed roof-top airports, the flight decks of watercraft and suitable other surfaces without reference to the prevailing wind directions or—within reasonable limitations—wind velocities.

The invention deals with subject matter which is disclosed, in part, in my co-entered application bearing the amended title, Landing and Launching System for Aircraft, filed April 27, 1948, as Serial No. 23,646, and is therefore to be regarded as a concurrent further expression of features common to the respective cases. It also relates to certain other co-entries, in which all elements therein of a complementary value are, by this reference, understood to be interrelated disclosures of similar art. The co-entered applications will be specifically referred to hereinafter.

According to the present invention, as complemented by said co-pending disclosures, both launchings and landings, which are among the leading sources of aircraft accidents, can be rendered as reasonably safe as may be expected wherein the human element remains a factor to be reckoned with.

One object of the invention is to greatly reduce the length of airfield runways presently necessary for launching or landing airplanes.

Another object is to provide low-cost, thoroughly practicable cross-wind auxiliary equipment for aircraft, which may be utilized for both landings and take-offs.

Another object is to provide cross-wind facilities for the launching and the landing of towable glider planes.

And yet another object is to provide means whereby aircraft can be quickly and safely landed in rapid succession on the flight decks of naval aircraft carriers, and launched therefrom, against cross-winds blowing contrary to the heading of such vessels; and whereby carrier operation need not involve, except optionally, the time-consuming routine of pointing the carriers in a particular direction, relative to temporary wind currents, in order to normally accommodate carrier-based aircraft landing thereon or launching therefrom.

Although certain objects of the invention have been given, others will be apparent in view of the detailed description hereinafter, including the claims and the drawings; and it is understood that only a limited number of the latter have been presented in order, primarily, to present a sufficiently clear but not unnecessarily complex disclosure of the various interrelated components and their modes of operation.

In the drawings—wherein numerals and other indicia relate to like parts in the respective views, unless particularly designated otherwise

*General principles*

Figure 1:
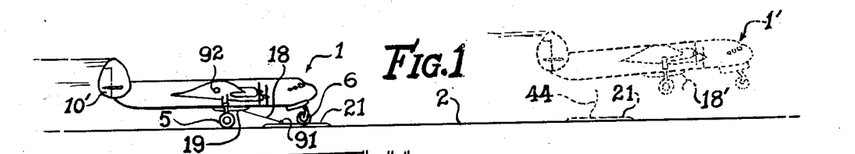
—Fig. 1 presents a side elevation of so-called cross-wind apparatus including an airplane, a launching device, and cross-wind undergear on said plane. The latter is assumed to be in a crabbed attitude relative to the prevailing cross-wind, such as is shown in Figs. 2 and 5.
Figure 2:
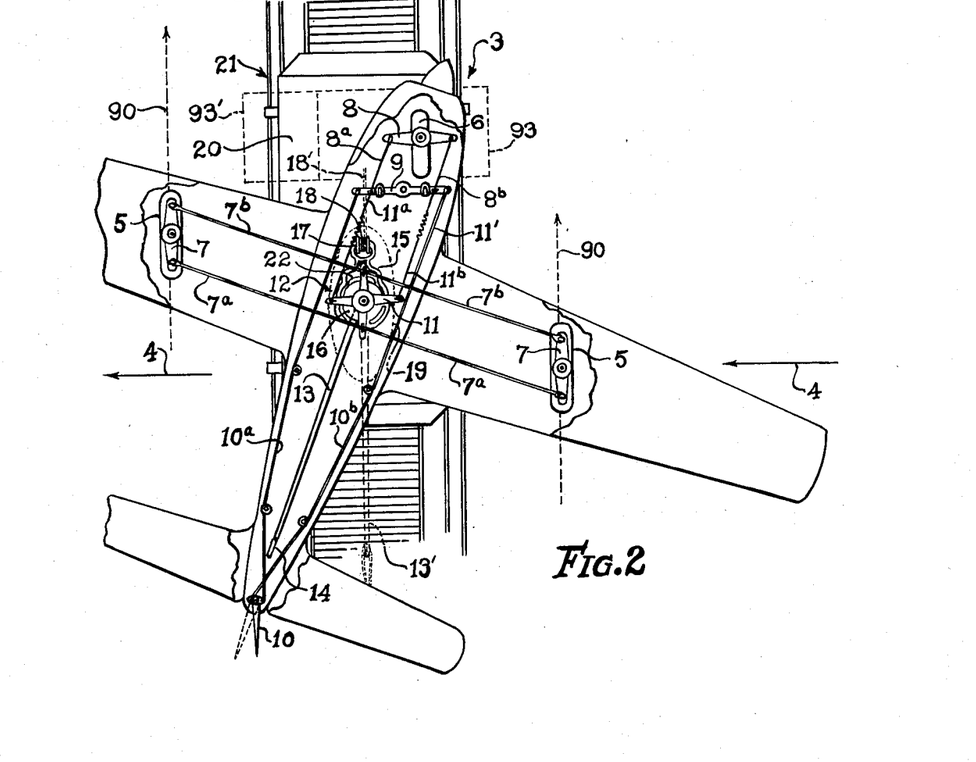
Fig. 2 is a partially schematic view from above of a typical lightplane, featuring cross-wind undergear in coordination with certain flight controls of the aircraft, and a launching device of the so-called electropult type.

Referring now to Figs. 1 and 2, the former shows an airplane 1 of substantial size during an intermediary stage of a launching by catapult assistance. The aircraft, while depicted in full side elevation, is assumed to be in at least a partially crabbed attitude relative to the runway 2, the exact angle of the crab being mainly dependent upon its speed and the force and the direction of the prevailing cross-wind. For example: in Fig. 2 the modified type of airplane 3 is, for illustrative purposes, assumed to be in its normally crabbed relation responsive primarily to a right-angular cross-wind of considerable velocity, as indicated by arrows 4.

Both the large aircraft 1 and the smaller aircraft 3 may, as elected, have similar undercarriages, in combination with auxiliary other cross-wind landing and launching gear; it being merely necessary to provide relatively heavier or lighter equipment as the individual service demands and aircraft sizes require.

Therefore, since both planes 1 and 3 are conveniently shown as having, by option, standard tricycle landing wheels, it will only be necessary to describe the main cross-wind auxiliary features of the latter aircraft, which has been broken open to clearly illustrate coordinated relationships maintaining between the undercarriage proper and specific control means coactive between such undercarriage and other elements of the cross-wind equipment. In order to facilitate a ready understanding of the several components, the cross-wind mechanism, as a whole, may be broadly viewed as comprising: (a), the landing wheels or comparable elements exemplified by skis, skate-runners, floats, etc.; (b) means operable between the landing wheels or the like and certain flight-controls, particularly the rudder controls, and (c) the so-called primary drift gear. These components may be further sub-divided.

For instance, in Fig. 2 the main landing wheels 5—5 and nose-wheel 6 have the respective lever arms 7—7 and 8 to which are attached control cables $7^a$ and $7^b$ as well as control cables $8^a$ and $8^b$, the latter connected also to the rudder bar 9 as generally indicated; and said bar, in turn, being in train with the rudder 10 through control cables $10^a$ and $10^b$. Rudder-bar 9 is also connected via control cables $11^a$ and $11^b$, having respective spring reliefs $11'$, to the lever arms 11 of the master-control cluster 12.

Said cluster here includes such main sub-components as: the cross-wind landing actuator, the latter especially exemplified, in this particular version, by the landing boom 13 and normally, preferably non-detachable snatch-hook 14—to be further defined hereafter—and the cross-wind launching actuator, as shown in the form of a sub-assembly including, among the many variable alternates, a yoke 15 carried from a partially rotatable carriage 16 and adapted to support a reel 17. Reel 17 is of the spring-motored type, comparable to well known self-retracting measuring tape devices, certain fishing rod reels and the like, whereby the towing cable 18 wound thereon, in its extended position, phantom $18'$, is adapted to be pulled manually downward through a suitable outlet on the lower side of a streamlined, partially rotative pan or blister 19, the latter contiguously carried on the underside of the aircraft.

Cable 18, in this modification, bears a terminal element which is formed for engagement to a cable-release mechanism—as later detailed in relation to Figs. 3 and 4, and by cross-reference to co-pending data—which is not here shown but is understood to be located on or accessibly adjacent the so-called launching deck 20 of the electropult car 21.

The master control group 12 also includes a servo-motor 22, which will be explained in relation to Fig. 3.

First, however, with reference to both Fig. 2 and Fig. 3, and by way of recapitulation, among the readily identifiable elements of the latter drawing are: the extendable and retractable landing boom 13, which is idly disposed within a lower longitudinal slot 23 but may be electively lowered downwardly, through the throat 24 of a boom-yoke 25 to position 26, for certain outboard relations of the snatch-hook 14 to be given later. Phantom $13'$ indicates one operative position of the boom in the course of such outboard relations. Yoke 25 is comprised of right and left arms 27, which are conveniently curved rearwardly inwardly to each other whereby to form the aforesaid throat 24 between the right and left extensions 28; which same are spaced to permit relatively free movements of boom 13 therebetween from its idle position within slot 23 to position 26, and at which area it is intercepted by contact with the lower end of the yoke substantially as indicated.

Yoke 25 is suspended from right and left lower sides of the partially rotatable carriage 16, as by means of a pair of stems 29 suitably anchored to the carriage. Said carriage, in turn, is rotatively mounted within the non-rotatable bearing or collar 30 and the latter supported within a suitable fixture 31 carried in any preferred manner from the aircraft fuselage 32. Boom 13, however, is in one relation unaffected by certain rotative actions of carriage 16 but, in another relation, is adapted to co-rotate therewith; since, while indirectly supported from the carriage 16, it is directly dependent from an inner carriage member $16'$, which latter is capable of remaining in a stationary position when boom 13 is within slot 23 but, upon movement of the boom between members 28, and particularly as at position 26 of the boom, inner carriage $16'$ along with the boom itself and the sub-assembly including motor 22, the worm 33, and gear wheel 34 rotatable on shaft 35, will receive rotative actuation from the boom along with the said first carriage member.

In short, in the latter relation, the boom is capable of lateral swingable movement; and when so swung—in the manner to be hereafter described—it imparts rotative motion to all of the just previously aforesaid elements after the fashion of a wagon-tongue. Moreover, similar rotative movement will also be given to the pan 19 (including the forwardly disposed yoke 15) which is carried from a plurality of lateral supports 36 as shown here in section only.

Supported on the upper side of the carriage 16 is a foursome of legs 37, forming a spider arrangement upon which is secured a foursome of the lever arms 11. In Fig. 3 the eyes $38^a$ and $38^b$ will be recognized as the anchor points for control cables $7^a$ and $7^b$ of Fig. 2 where said cables are tied in to the master control group 12. Similarly, right and left eyes $38^c$ are anchors for control cables $11^a$—$11^b$ as earlier aforesaid. It is by now quite obvious that when "wagon-tongue" motion is imparted to boom 13, such motion will be translated immediately, mechanically, automatically through levers 11 and control cables anchored thereto to each of the wheels 5—5 and 6 as well as to rudder 10 through rudder bar 9 by way of cables $11^a$—$11^b$ and $10^a$—$10^b$—the movement of the rudder bar, of course, steerably controlling wheel 6 through cables $8^a$ and $8^b$.

The lateral motions of boom 13, however, inclusive of co-actuating movements of the respectively named auxiliary devices responsive thereto, is yieldably restrained by the one, at least, spring 39, an end of which is conveniently attached to eye 40 and the other end preferably carried from an anchor point suitably advanced from said eye and forwardly thereof. Such anchor point is not shown, but see the like element disclosed in various views of my aforesaid co-entered application called Landing and Launching System For Aircraft. It is obvious that any of a plurality of means may be substituted for spring 39, as in the case of specific other elements of the instant disclosure. Motor 22, of course, controls the upward and downward movements of the boom by means of any suitable electrical hook-up between the motor and the pilot's cockpit, for example.

Alternating functions

Skilled operatives will readily understand that the aforesaid boom assembly, including yoke 27, relates to landings—as further detailed hereinafter and co-pendingly—while the assembly of yoke 15, Figs. 2 and 3, including reel 17 and cable 18, relates to launchings. In the compact, cooperative arrangement here shown, however, the respective components are each integrally, but in alternating relations, associated with the train of control at all times extending through carriage 16 and the foursome of lever arms 11 to both the wheels 5—5 and wheel 6 and desirable aerodynamic controls—as to rudder 10. But in ordinary flight the boom remains in slot 23 above the yoke 25 as shown, and this is its position during take-off operations. At such times boom 13 and inner carriage $16'$, inclusive of motor 22, are stationary; but the respective yokes 15 and 25, as well as pan 19, are free to be rotatively moved along with carriage 16 responsive to the application of tow-pull on cable 18. This will occur when the terminal 41 has been brought into engagement with the cable-release mechanism of the car 21, Fig. 2, as mentioned earlier, and the car is under forward speed.

Terminal 41, incidentally, which clearly is but one of sundry devices which could be employed within the range of possible equivalents, is a cam-pin formed for releasable engagement with a standard cam-lock of well-known complementary type. In lieu of pulley means, cable 18 is carried through the central opening of a ball-bearing guide 42, intermediary of reel 17 and the small slot 43; which latter has an upper opening sufficiently large for free movement of cable 18 therethrough, and, as elected, large enough to receive pin 41 in the position shown but not so large as to permit said pin to be withdrawn to an inaccessible location within pan 19.

When pin 41 is to be engaged to the cam-lock of the cable-release mechanism, it is merely pulled outward and downward manually against the tension of the spring-motored reel 17—as at the tow-cable position 18′—and then made fast as aforesaid. And on being released, it will be automatically snapped back to the slot 43.

Figures 7, 8, 9, 10:
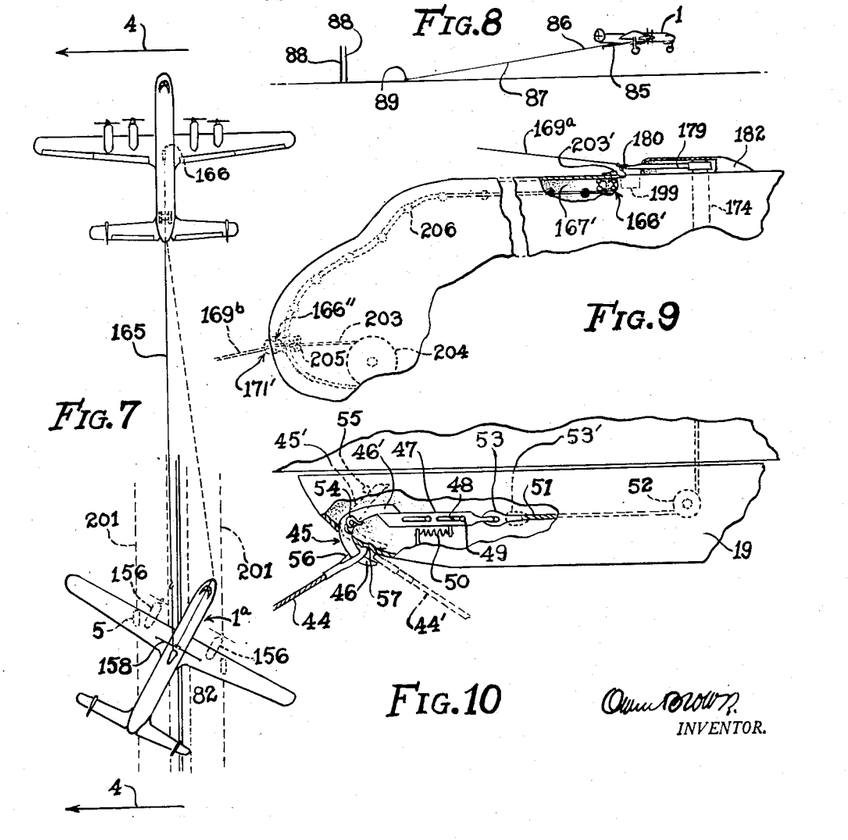
Fig. 7, taken from above, shows the towable aircraft to be launched of Fig. 6 in a fully crabbed relation directly after towing contact therewith has been effected by the locomotive plane.
Fig. 8, in side-elevation, briefly indicates one stage of a typical landing operation according to the invention. The airplane is assumed to be in a crabbing attitude.
Fig. 9 is the partly broken open, partly schematic view in side elevation of the upper frontal and middle portions of an aircraft, which includes means for initially assisting in the towing of said craft from mechanism located at its approximate center of rotation and for thence shifting the tow-line take-off point forwardly on the aircraft.
Fig. 10 is a fragmental view of the lower fuselage of an aircraft, in side elevation, taken at an area adjacent its center of rotation, and a fragmental portion of cross-wind undergear thereon in the use of which one type of ground-car towing cable may be releasably attached thereto.

Another type of cable-release which may be employed is shown in Fig. 10, wherein the towing cable 44 is securely anchored to the catapulting component (not shown) and releases automatically at the aircraft. That is, in the specialty device of the drawing, element 19 is a fragmental portion of the pan of Fig. 3 and the pivotally mounted hook 45 is formed with an outwardly disposable beak 46 as well as an inwardly disposing jaw 46′ having intercepted engagement, substantially as shown, with the slide-bolt 47. The latter has the duality of slots 48 for sliding engagements forward and backward relative to the pair of stop-pins 49; and bolt 47 is operable against the tension of spring 50 which automatically maintains it in the position shown subject to retraction by a pull on cable 51, which cable is carried thence to any suitable location for actuation; as by way of schematic pulley 52.

The further disposal of cable 51 and specific means for its actuation need not be given, as the same are but elementary engineering details in the light of this disclosure. And it is obvious that when, in emergency, it becomes necessary for the pilot or other operative to actuate cable 51, as soon as the terminal 53 is at phantom position 53′ the jaw 46′ is no longer intercepted by bolt 47 and may move downward as necessary for the ready release of cable 44, position 44′.

When locked against bolt 47, however, all tow-pull upon cable 44 is imposed against said bolt, a tortion spring 54 serving merely to retract hook 45 to the inboard position shown by phantom 45′, in contact with stop 55. In this version, cable 44 has the ring-terminal 56, and in order to facilitate the action of beak 46—urged inwardly by spring 54—in maintaining ring 56 firmly but releasably, a slight recess 57 may be formed in the exterior of pan 19 at the location indicated. Thus when ring 56 is inserted between beak 46 and the adjacent pan 19 and pressed upwardly, it will snap partially into recess 57 and will be there releasably held against any tendency to drop out prematurely: as, for instance, when the motor or motors of the aircraft are being warmed up, which, in the case of propeller-driven airplanes, generally produces a straining forward against any holdback cable or the like which may be employed prior to actual operation of the launching device. That is, the airplane tends to crouch down against the yielding action of the tires and oleo struts enough to create slack in cable 44.

It is quite clear, therefore, that cable 51 and lock-bolt 47 need only be retracted in case of emergency and that, normally, the ring 56 will readily release from beak 46 and recess 57 as soon as the aircraft rises to the take-off.

Figure 3:
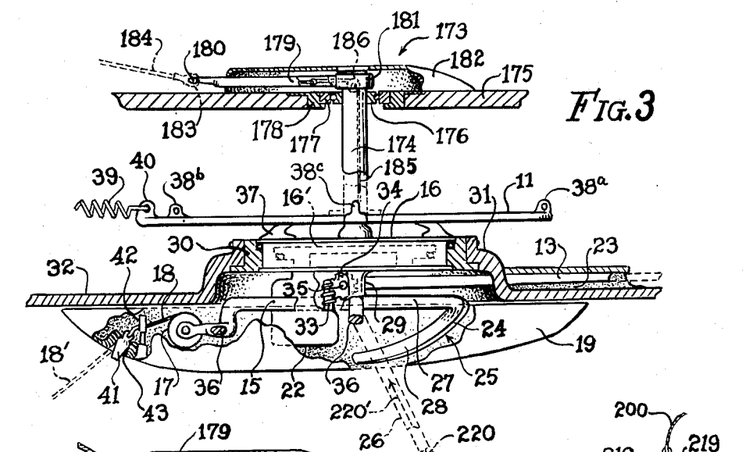
Fig. 3 is a broken open, side-elevational detail of cross-wind landing and launching apparatus which—wholly or in part—may be installed on various classes of airplanes and including towable gliders.

In Fig. 3, the upper assembly there shown is not essential in the operation of the landing or launching elements thus far described but relates to alternative structures and techniques to be detailed later in connection with Figs. 6, 7, 9, and 11 to 15 inclusive. Meanwhile, it should be clear that various equivalents may, and doubtless hereafter will be found advantageous for particular installations, depending on cost factors and other considerations. Accordingly, from among the sundry specific adaptations, the similar but variantly different and more simplified apparatus of Fig. 4 will now be explained.

*One simplified equivalent*

Figures 4, 5:
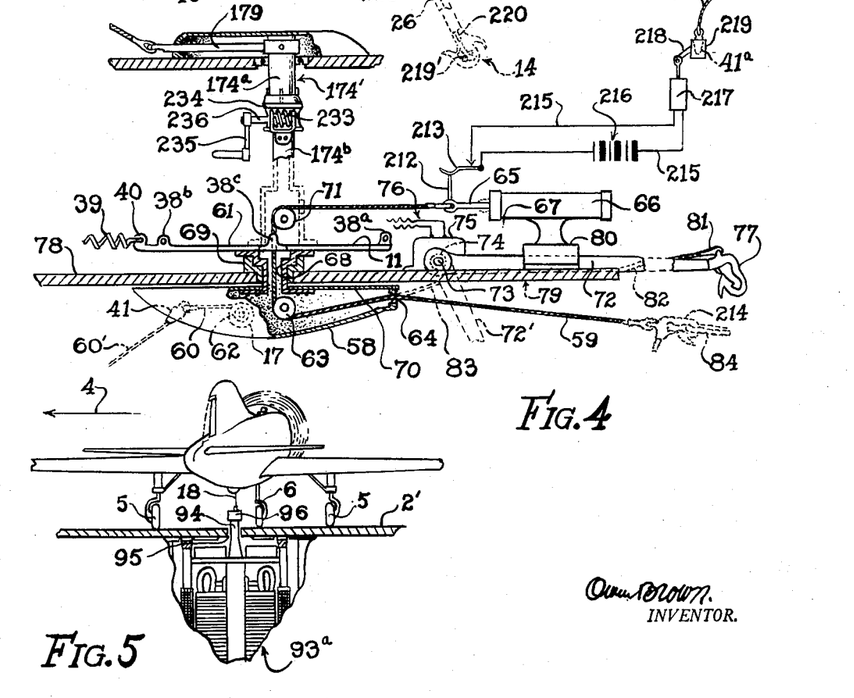
Fig. 4 is another broken open, side-elevational detail of cross-wind landing and launching apparatus, of a similar but variant form to that first seen in Fig. 3, including diagrammatic cable-release means.
Fig. 5 is comparable to Fig. 2 but distinguished therefrom by the launching means, as here embodied in the form of electropult mechanism of a modified type.

It is apparent that the Fig. 4 structure has a greatly reduced number of working parts, and those utilized are of very simple form. The specific modes of operation therewith are equally simple and sure-acting. In this modification, a relatively small pan 58 is merely required as a streamlined housing and rotative take-off means for respective cables 59 and 60, and, therethrough, for actuating the lever-arm foursome 61 to in turn operate the undercarriage and aerodynamic controls—which latter may be similar to those already described relative to Fig. 2. In brief, eye 38ᵃ may be the same as the like element of Fig. 3, as related to Fig. 2; and this applies equally to eyes 38ᵇ and 38ᶜ as well as the eye or similar fixture 40 to which one end of spring 39 is anchored.

It is, moreover, obvious that since the reel 17 may be quite narrow, pan 58 need be no wider than necessary to provide respective right and left mountings 62 therefor; it being further evident that the lower schematic pulley 63 can be yet smaller and the annular ball-bearing escapement member 64 just large enough for the obvious function of providing relatively brief movement of the so-called cable halter 59, against equally limited movement of piston rod 65 relative to shock cylinder 66. The latter, in a simplified assembly, can be of the ordinary pneumatic door-check type, containing the usual compression spring or springs (not shown) and a suitable air-bleeder or bleeders 67. See, for example, the like elements in said co-pending application having Serial No. 23,646. The cam-pin 41 attached to towing cable 60—similar to cable 18 of Figs. 2 and 3—will be sufficiently self-explanatory in view of the description of like and related elements shown in Fig. 3. Obviously, therefore, phantom 60′ represents the outboard position of cable 60 when payed out from reel 17 to the towing car or equivalent catapulting means.

Pan 58 (which may be as long as necessary for adequate leverage) is carried from the sleeve 68, which sleeve is mounted for rotative movement in a bearing 69; the lower radially outwardly flanged collar of said sleeve being, in this version, secured to an upper bridge 70 of the pan. Or element 70 may be formed as a spider or an an upper closure for said pan, for example. The flanged upper collar of bearing 68 supports the multiple lever device 61, and the normally cylindrical configuration of the bearing permits every required clearance for halter 59 to pass therethrough from upper pulley 71 to lower pulley 63. While not specifically shown, halter 59 also passes through an axial opening in the lever device 61 intermediary of the several eyes 38ᵃ to 38ᶜ inclusive, the latter in right and left duality as explained in connection with Figs. 2 and 3.

The boom 72, however, differs from boom 13 of Fig. 3 in several respects. It is, for example, at all times non-co-rotative with pan 58; being preferably mounted to the rear of the same but preferably co-longitudinal therewith in the latter's usual flight position and co-longitudinal, in general, with the fuselage of the aircraft approximately as shown. The pivot 73 is integral with a shaft 74 which is connected to and driven by motor 75 and the latter remote-controlled from the pilot's cockpit—or as desired—such as by means of a control panel (not shown) and a suitable current source wired in to the conductors 76. Hook 77 is of the general type shown in said last mentioned co-entry, Serial No. 23,646, and is detachably socketed to the end of the boom in the manner there more graphically detailed.

Preferred operative techniques with respect to hook 77, as well as hook 14 of Fig. 3, will be given shortly.

This boom, Fig. 4, is received within a longitudinal slot on the underside of fuselage 78, as indicated at numeral 79, and may, if desired, be straddled by the suitably grooved lower side of the base member 80 which supports cylinder 66. In the idle position of hook 77, the halter 59 is secured thereto by any satisfactory thimble or the like 81; and in order to afford ample clearance for the halter without unnecessary widening of slot 79, a brief and shallow diagonal groove 82 may be formed in one side of the boom adjacent the free end thereof. Thus, at the time hook 77 is socketed to the boom, a brief segment of the halter can be pressed into slot 82 and thence pressed again into a small break-out clip on the lower side of the boom, similar to one of the simplified spring clips illustrated in the patent to R. C. du Pont, No. 2,418,702 entitled "Method and Apparatus For Launching Aircraft," as on sheet 2 of said patent. One or two relatively weak clips of this type would hold the greater length of halter 59 along the lower side of the boom to the take-off therefrom—see phantom 83—adjacent escapement bearing 64; and when the boom is later lowered by motor 75 to the striking position 72′, to be more fully detailed later, halter 59 will readily strip free of the break-out devices immediately upon engagement of hook 77 with the ground hawser loop 84; which operation will also be sufficiently further explained in due course. Any preferred other temporary disposal of halter 59 is permissible, as expertly determined.

The arrangement explained is, to be sure, subject to various modifications, which will now readily occur to technicians of the related art—especially in view of old and well known other hook-and-boom combinations regularly employed in glider and parcel pick-up services, wherein, after the benefit to be derived herefrom, only ordinary mechanical aptitude would be required to adapt comparable elements to the needs of the present invention. See, for example, such patents as the said issue to du Pont, the patent called "Air Pick-Up System," No. 2,373,414 to S. C. Plummer, or Patent No. 2,359,275, titled "Load Pick-up Device" to R. O. Anderson, to mention typical examples.

Fundamental distinguishments

It is important to note, at this juncture, that the cross-wind apparatus herein—in common with co-pending disclosures, which deal more particularly with landing techniques and structures—is fundamentally different from the existent art; the latter heretofore featuring, very largely, devices such as, or comparable closely to, those employed in the well known Maclaren system. These are, without exception, characterized by mechanisms embodied solely in the aircraft structures.

The system disclosed herein and co-pendingly, on the other hand, is distinguished from such art and from all prior forms by the interdependency between tackle elements carried by the aircraft to be landed or launched and means complementary thereto at a landing or launching station.

Thus, in my co-pending application, Serial No. 23,646, apparatus and techniques are explained whereby relatively hazardous cross-wind landing operations may be rendered quite safe and largely automatic. It would be unprofitable to graphically show or discuss these different devices herein, and, for present ends, it is sufficient to present only one or two brief indications of the same as characteristic of the means employed. The present disclosures relate primarily to cross-wind airplane gear wherein, in single embodiments, the aircraft is capable of cooperation with two distinct classes of surface apparatus: namely, landing apparatus and launching apparatus. In addition to the surface means at the landing and/or launching station, however, locomotive planes may also be employed as hereafter explained.

The landing apparatus at a surface station may be such as set forth in the last aforesaid co-pending application, or it may be any specific equivalent thereof. In said application the aircraft to be landed, such as hypothetical airplane 1 of Fig. 8, has a boom-and-hook assembly 85, or equivalent means, adapted to engage a ground loop 86 or its functional alternate which is carried as a terminal at the freely disposable end of a landing hawser 87; loop 86 having previously been releasably positioned in the path of the boom-hook. The preferred means for releasably supporting loop 86 are a pair of spaced apart standards 88—88, similar to the aforesaid station poles used in glider and parcel pickup service.

Figure 13:
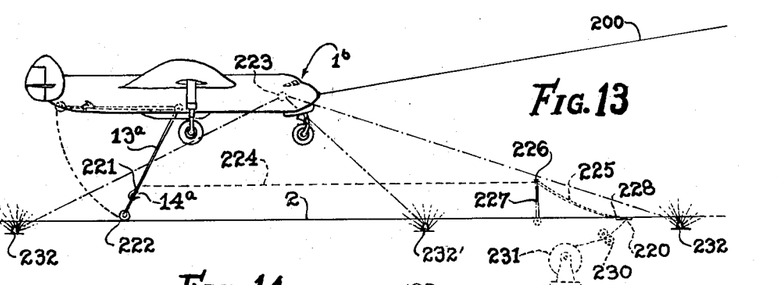
Fig. 13 shows one of the gliders of Fig. 12 prior to final landing contact, featuring one type of cross-wind undergear and one of sundry variable forms of station equipment, in combination, which may be employed. The view is obviously side-elevational.

Mechanism from the hawser 87 is extensible may vary greatly, but is here assumed to be a sub-surface vehicular device (not shown) having a pay-off member 89 which protrudes above the plane of the landing surface. Details concerning at least one installation of this general order may be found in said last named co-pending application. See also later reference herein to the landing devices of Figs. 12 and 13.

Before explaining the operation of the combination cross-wind landing and launching appliances of Figs. 3 and 4, under actual service conditions, the detailed apparatus of Figs. 1, 2, and 5 will be explained.

Operational features

In Fig. 1, airplane 1 is being towed along surface 2 by a powered catapult car 21, which is of the so-called electropult type. See also Fig. 2. Such devices are propelled by developed or "flattened-out" induction motors, conveniently called linear motors. Details thereon may be had by reference to Patent No. 2,404,984 entitled "Electric Towing-Car Catapult For Aircraft," issued to F. B. Powers, and No. 2,404,963 called "Tensioning Device" to M. F. Jones et al., as well as No. 2,412,511 to said Jones entitled "Electrically Propelled Car Construction," the latter relating to the variant form to be explained in connection with Fig. 5.

Plane 1 is connected to car 21 by means of the short towing cable 18—see also Figs. 2 and 3—although obviously cable 60 of Fig. 4 is an equivalent thereof as is cable 44 of Fig. 10. Cable 18, as best seen in the Fig. 3 combination, pays out retractively from a reel 17 of the lower pan 19; and the aforesaid cam-pin 41 is releasably attached to a cam-lock associated with the anchor 91. As previously mentioned, any preferred other cable-release means may be employed.

The cable take-off point from pan 19 is well forward of the center of balance 92 of the aircraft, whereby the latter is fully self-steerable and the pilot is momentarily relieved of his usual duties in this connection. This is especially advantageous for the reason that the interim between starting and launching is quite brief. Airplane 1 has swiveled landing-gear wheels 5 and 6 which, with the aircraft in a presumably crabbed position relative to car 21 and the lineal lay-out of the runway surface 2, are traveling in the same direction as the towing car, as more clearly indicated by airplane 3 of Fig. 2.

Thus the take-off point of cable 18 is also forward of the aircraft's center of rotation, and will be determined by the location of said wheels and the assembly including carriage 16, Fig. 2. In this relation it is adapted to exert the aforesaid wagon-tongue or bridle action on rudder 10' and all three of the landing gear wheels through the agency of the plurality of control cables connected thereto and to the lever group 11.

The fixed center of rotation may be varied—originally, that is—within certain limits, as see said application bearing Serial No. 23,646, and is not necessarily at the same location as the static center of balance, but desirably adjacent thereto. Obviously the exact center of rotation could be differently located on different airplanes or gliders, much depending on such factors as whether the undercarriage is of the tricycle or reverse tricycle type, for example; but such a matter is within the domain of orthodox engineering, rather than invention, and need not be elaborated upon here.

Suffice it to say that when employed on properly engineered aircraft the cable 18 will serve as an intermediary means for not only maintaining the wheels 5 and 6 in correct parallel travel paths throughout the launching run but that, by maintaining airplane 1 in a towed relation, all possibility of nosing and ground-looping is prevented. The fuselage, of course, is not pointing directly into the headwind but will have been slued partially to windward against the yielding restraint of spring 39, Fig. 3, and the pull of cable 18 augmented by the usually automatic corrective action of the entrained rudder. Consequently, while the aircraft fuselage and wings are still subject to the action of sudden ground gusts, such forces are instantaneously and automatically balanced out by the said wagon-tongue action of cable 18.

In short, the launching operation is largely governed by the same basic principle and underlying technique set forth co-pendingly in respect to cross-wind landings. According to the Maclaren system, as taught originally in U. S. Patent No. 2,222,850 entitled "Aircraft Undercarriage," and subsequently modified by U. S. Patent No. 2,345,405 called "Aircraft Alighting Gear," the subsidiary wheel has castering action, and, except for the limited steerable override thereon, all components of the rolling gear must travel in irreversible interlocking positions co-longitudinal with the runway. Moreover, in landings, it is incumbent upon the pilot to estimate wind directions and velocities with considerable accuracy so that touch-downs will take place with the aircraft body properly oriented to the wind and contrary to the line of travel.

But under the present system such operations—including launchings—are largely automatic; all of the wheels may be castered, but, with the possible exception of the subsidiary wheel, may be merely swiveled; and they are not normally, truly interlocked except in cooperative assembly—and freely weavably—with the master control and actuator means: the latter being, in one relation, the boom 13 during landings and the towing cable 18 during launchings, for example. It is obvious, however, that the halter 59 of Fig. 4, following momentary use of boom 72, becomes the actuator means in the course of landings with the simplified tackle therein, to be further clarified.

Hence, during both landings and launchings, guesswork and the necessity for precisely and continuously maintaining the movements of the airplane (by pilot operated controls) according to the fickle and changeable cross-wind directions and velocities, as well as for the use of any essential steerable override on the subsidiary wheel, according to the prior art is eliminated. The antagonistic forces of the respectively opposed components, particularly the wheel and wind components in their separate relations to the body and wings of the airplane, are automatically teamed and coordinated. In landings, the aircraft is movably guyed by the tethering action of the landing hawser, in coaction with the aforesaid master controls; and in launchings, similar coaction is effected through the tow-line equivalent of draw-bar pull, but with a desirably greater freedom between the locomotive and the trailer to automatically cancel out uneven side thrusts tending in a minor way to overcome stability. That is, the craft may "weave" slightly, without any accompanying wheel-skidding whatever.

Since none of the wheels 5 and 6 is set and irreversibly interlocked, and since directional stability is automatic, any pilot-actuated overriding effect on wheel 6 would, ordinarily, seem superfluous in these particular operations; but the same could, in a measure, be applied through rudder bar 9; as, for example, at any time in the course of a landing or launching operation when special limited coordination between wheel 6 and rudder 10 might be momentarily desirable. Such limited coordination is, by option, provided in the form of the aforesaid spring reliefs 11.

Any of sundry standard types of wheel suspensions may be utilized, such as those featuring orthodox oleo struts, when adapted for swiveling and/or castering the wheels; but the invention is obviously not limited to a particular type or types of suspension, and could be carried out on such relatively unorthodox undercarriages as those having so-called bicycle main wheels appendant from the fuselage in cooperation with bantam size wing wheels—as employed, for example, on the United States Army's XB–48 bomber. The American Cessna 190 and 195, for instance, are other unconventional cases in point. It is merely necessary, in general, that the main wheels shall be swiveled in any preferred manner, as readily expertly determined.

Other structural details

Reverting again to Figs. 1 and 2, it is apparent that the nose wheels 6 are resting on decks 20 while main wheels 5 are in rolling contact with surface 2 in order to impose the weight of the aircraft on the runway instead of on the launching car. As the electropult car may be quite small in proportion to the size and the wheel spread of the aircraft to be launched, it is unlikely that any sudden, powerful gust of wind could swerve airplane 3, for example, even momentarily far enough out of true with the tread paths 90—90 of wheels 5—5 to produce a collision with car 21. The normal expectancy is that such momentary forces would be quickly cancelled out. Nor would wheel 6, at such a time, be cammed off deck 20.

Against such a latter possibility, however, the forward end of car 21 could have a sliding panel 93, mounted in any preferred manner for movement either to the right or to the left (phantom 93') and there temporarily locked. Its position of setting could be readily predetermined according to the wind direction, the shelf thus afforded serving as a temporary support for the nose wheel in such an emergency. The feature might, in any event, be employed on installations where the size of car 21 is substantially smaller than the airplane, rather than according to the scale of Fig. 2.

Fig. 5 briefly illustrates another form of electropult 93ᵃ—see said Patent No. 2,412,511 to M. F. Jones—where both trackage and car are below surface level and only a tow-strut 94 protrudes thereabove through slot 95. In this modification each of the wheels 5, 5 and 6 is resting on the surface 2'; and since strut 94 would be at the approximate relative location of anchorage 91 in Fig. 1, no collision therewith could normally occur under operating conditions. Strut 94 is topped by the box 96, which serves as a housing for the cable-release mechanism, which mechanism may be similar to that earlier mentioned in connection with anchorage 91; cable 18 being, for illustrative purposes, assumed to be similar to the like element in Figs. 1, 2 and 3. Arrow 4 indicates a full right-angular wind. The box 96 is not scaled and need be no larger than necessary to hold a cam-lock, for example, since means for energizing such a lock can be carried below surface level. Alternatively, for another example, the cable 44 of Fig. 10 could be releasable at the aircraft.

Other means and modes

Little further need be said—for the benefit of skilled operators—as to actual launching procedures according to the structures of Figs. 2, 3 and 4. In brief, however, according to Fig. 1, it is obvious that when plane 1 arrives at its generally predetermined take-off point along surface 2, the aircraft can launch in the manner indicated at position 1'. And at this time any of the previously given options, may be employed to disconnect the airplane from the catapult.

For example: the technique outlined in said patent to F. B. Powers, No. 2,404,984, may be followed, whereby the take-off area is fairly accurately predetermined by the known weight of the airplane and other factors; in accord with which the car 21 attains the required preliminary speed and then begins to sharply decelerate, thus permitting the airplane to rise therefrom by overrunning the launching car, while a cable 44 or the like automatically disconnects from the airplane 1 in the manner which will be recalled in relation to the similar element in Fig. 10.

The arrangement there shown is a particularly versatile one, however, since it provides four distinctly different options whereby plane 1 may be released from car 21, or from the tow-strut shown in Fig. 5. That is (a), cable 44 may release automatically from the aircraft, as at phantom 44'; (b) it may be released therefrom in emergency by the pilot of the airplane, as provided for by pull-cable 51; (c) by also connecting the other end of cable 44 releasably to the electropult launcher, such as by means of a camlock pin 41 or suitable equivalent thereof, plane and cable could both be released in emergency upon actuation of a suitable button switch in the control tower; or (d) by an automatic trip-switch (not shown) of well known type.

It is obvious, too, that this form of cable release could be employed on the launcher itself, whereby hook 45 would be mounted thereon instead of on the aircraft; and, in that case, the terminal 56, upon its automatic or other release from the launcher, could retract into a suitable recess therefor according to the technique explained in connection with elements 17, 18 and 41 of Fig. 3.

Obviously, the method explained in said last mentioned patent to Powers may be adapted to certain of the specific options given herein, as already related. The phantom 18' of Fig. 1 indicates the retractive action of cable 18, Figs. 3 and 4, where the towing cable is releasable at the launcher instead of at the aircraft—as in the case of cable 44. Launchings according to the simplified structure of Fig. 4 are of course similar to those given specific to Fig. 3; but a different technique is followed for landings, as in the copending application bearing Serial No. 23,646. See also later references herein to Figs. 6, 7, 12 and 13.

Figure 6:
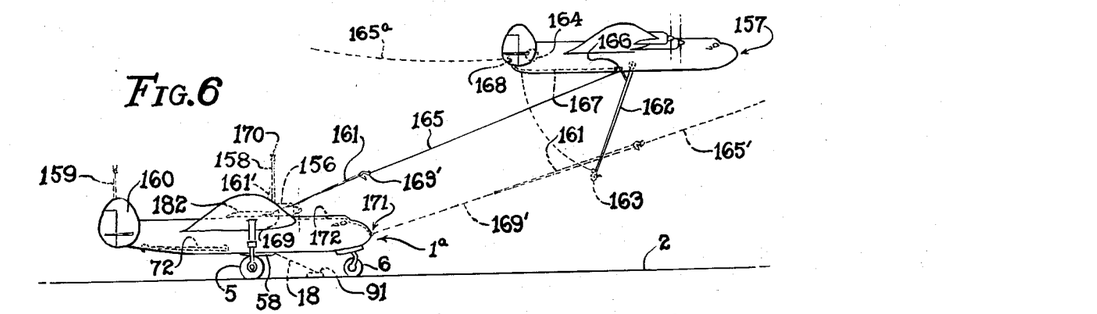
Fig. 6, in side elevation, features an aircraft to be launched having cross-wind gear and self-embodied "hand-over" tackle, so-called, and assisting take-off means therefor including a sub-surface towing-and-launching device and a locomotive plane bearing thereon so-called "take-over" tackle. The craft to be launched, if in motion at the time of engagement by the locomotive, and preferably therebefore, would be in a crabbed attitude with respect to the cross-wind.

Fig. 6 illustrates a plurality of options for launching the aircraft 1ᵃ. Thus craft 1ᵃ may be the airplane 1 of Fig. 1, as indicated by hypothetical wing motor 156, or it may be a towable glider but having thereon crosswind landing and launching gear such as explained in relation to Figs. 3 and 4. And, if a self-propelled airplane, it may be merely assisted prior to and during the take-off operation by the locomotive plane 157 or, alternatively, by locomotive 157 augmented by a launching device, comparable to electropults, as indicated by phantom tow-line 18 and anchor-point 91 thereof; it being understood that, in this version, the remainder of the catapulting device is below surface 2. The augmented technique for launching a self-propelled airplane is relatively simple and will be explained first, following a description of auxiliary instrumentalities essential thereto.

According to one option, it may be assumed that the large aircraft 1ᵃ is heavily loaded and must take off from a comparatively short runway—which could be a one-way strip—against a brisk cross-wind. Under such conditions, and assuming that the craft has cross-wind launching gear thereon as herein described, it could be assisted in taking off by the locomotive airplane 157, or, according to another option, by said locomotive in coordination with the aforesaid catapulting means. In either case, craft 1a—if self-propelled—would normally be in motion at the time of engaging contact between itself and plane 157, hence the necessity for providing—in lieu of conventional immobile station poles, as in glider pickup systems, for example—a duality of right and left standards 158 for supporting a loop 161, position 161'.

On high wing aircraft of sufficiently large sizes such standards can be retractively carried on the upper wing surfaces or the upper fuselage of the aircraft. Alternatively, a like pair of standards 159 may be temporarily mounted—though less desirably for present ends—as far aft as the vertical stabilizers 160. According to another option, the standards may be mounted only temporarily, so as to drop to the ground following locomotive contact being effected with loop 161 appendable therefrom, according to the method hereafter explained. For details concerning loop supports of this general class, see said Patent No. 2,418,702 to R. C. du Pont. And see also my lately co-pending application "Intercooperative System for Airborne and Surface Carriers," Serial No. 707,153, which has matured into Patent No. 2,639,159.

For such an assisted take-off, the locomotive plane 157 has the boom 162 and detachable hook 163—comparable to hook 77 of Fig. 4—as well as an inboard shock winch 164 which, in this preferred embodiment, is located at the rearward position indicated but having a launching and towing cable 165 payable therefrom and connected to hook 163—as here shown at its detached position 163'.

Moreover, cable 165 is adapted to be carried through an intermediary element in the form of a roller-dolly 166, which is movable to a position adjacent the lower center of balance and just aft of the boom suspension on the underside of the locomotive plane along a lower, desirably centrally disposed slotway 167. From this location, dolly 166 is movable again, along said slotway, to position 168; which latter position is, by choice, the rearward terminus of the slotway at the tail end of plane 157 and, by further preference, within a so-called tow-room, comparable to such as are shown in said last mentioned patent.

Aircraft 1a has swiveled main wheels 5 and nose wheel 6, the latter preferably castered, as well as a lower pan 58 and cowl 182; as see also Fig. 3. Boom 72 is of course for landings, as elsewhere explained. In this connection, for the avoidance of possible earlier confusion, reference to the upper component 173 of Fig. 3 was not previously made since not essential to operations described heretofore. According to certain preferred special techniques, however, component 173 or equivalent apparatus is additionally indicated for either towable gliders, which are to be launched in the manner hereafter explained, or for a self-propelled aircraft 1a, where the same are to be launched by airplane locomotive assistance.

For the present, then, it will be understood that craft 1a has either the full complement of cross-wind apparatus shown in Fig. 3 or the simplified mechanism of Fig. 4 including component 173. Thus, in addition to other elements already defined, the composite lever member 11 has, in integrated relation, the upstanding, preferably cylindrical steering column 174, which column extends vertically through the fuselage to and through the upper fuselage skin 175. Column 174 is provided with an annular bearing sleeve 176 secured thereto against relative rotation therebetween, but adapted for limited co-rotation with the steering column within the annular race 177, which latter member is suitably supported in anchorage 178. Column 174 is also fitted with the outboard lever arm, or so-called control-tongue, 179 having a cable-holding-and-releasing hook 180, and is secured to said column by the integrated collar 181. A streamlined cowl 182 extends over and around the protruded portion of column 174 and, preferably, encloses all but a briefly protruded section of arm 179 approximately as shown.

Hook 180 is formed to receive the thimble 183 or the like of a cable 184, and said hook is adapted to release thimble 183 under tension upon inboard actuation of the pull-cord 185; which cord is trained over a pulley 186 and extends thence downward through the inside of steering column 174 and finally therefrom, as desired, to any suitable location on the aircraft for convenient actuation.

Figures 11, 12:
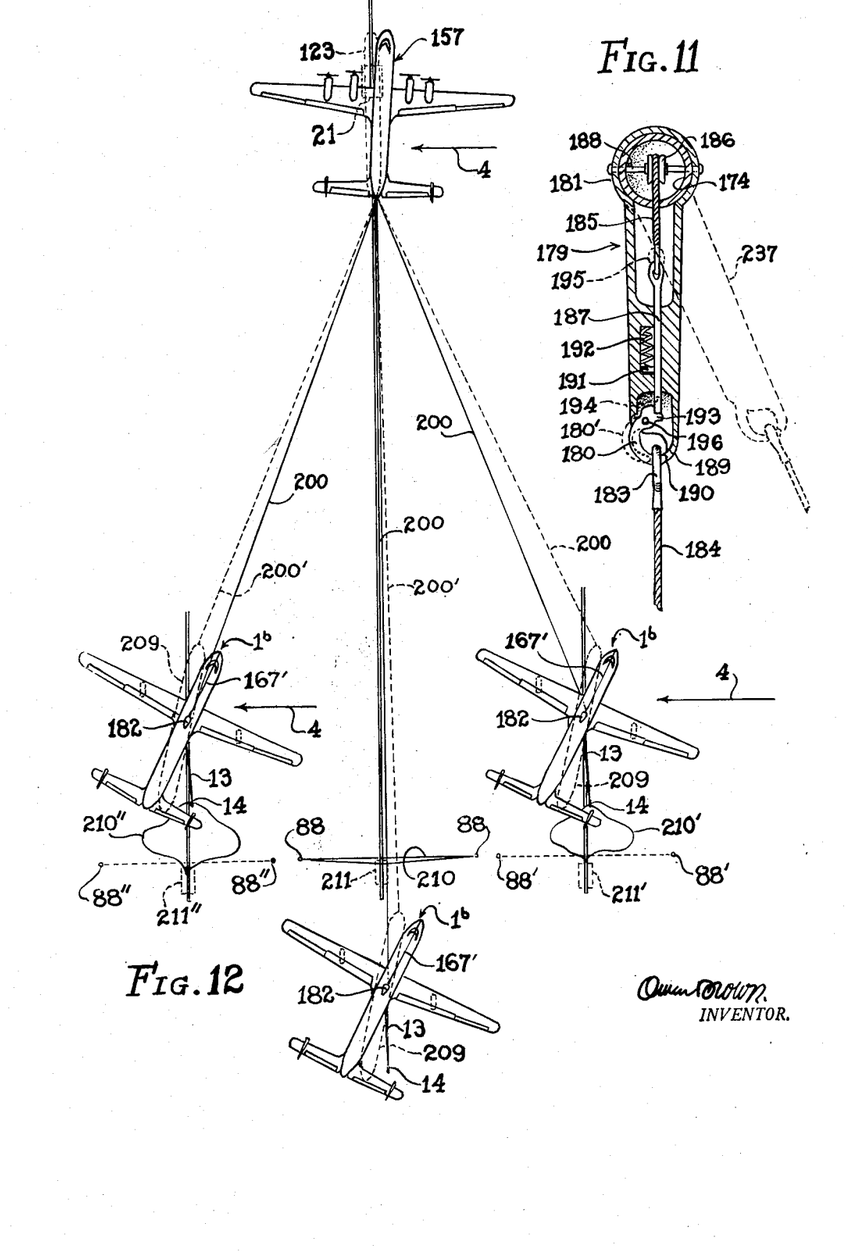
Fig. 11, looking down from above, shows a full transverse sectional view of one generally preferred form of cable-release applicable especially to towable glider craft in coordinated structure with a cross-wind sub-component, the latter here adapted for towing and launching functions.
Fig. 12, as seen from above, illustrates a method by which glider aircraft may be towed into engagement with ground apparatus for landing and decelerating aircraft, such as aircraft having cross-wind undergear; the same view being applicable to illustrate complementary launching techniques.

Control-tongue 179, however, is best seen in the detail of Fig. 11, looking down from above; said arm being there laid open along its entire length whereby to more clearly disclose this particular type of cable-release, exemplified by said hook 180 and the slidable lock-bolt 187 in conjunction with the aforesaid pull-cord 185. Pulley 186 is carried in the fixed location indicated on shaft 188 from the walls of collar 181 and column 174 therewithin. In the drawing, the tongue or arm 179 is conveniently formed with a lower right-hand mandible 189, adapted to co-lock with the complementary jaw or beak 190 of hook 180 in its closed position, whereby to hold the thimble, ring-bolt or similar terminal 183 of cable 184 securely, releasably.

It is obvious that when cord 185 is given a sudden jerk, lock-bar 187, having finger 191 operable against the resistance of compression spring 192, will be momentarily withdrawn from pawl 193 formed in the upper section of hook 180—as at position 194 and terminal 195— said nook yielding to position 180' about the off-set pivot 196 responsive to the load tension on cable 184. As somewhat further detailed in the similar element of Fig. 14, arm 179 may have special self-lubricated bearing members 197, upper and lower, for slidable contact with the complementary bearing surface 198 or vice versa.

While Figs. 3 and 11 illustrate one simple, practicable cable-release, it follows that sundry equivalents thereof may be now readily substituted by those of ordinary skill, after the benefit to be derived herefrom. To mention but one of many possible equivalents, it would be a simple matter to incorporate the cable-release mechanism of said patent to Du Pont, sheet 5 thereof, the latter mechanism providing for both manual release and release by radio remote control.

Other detailed procedures

Returning to Fig. 6, it will be readily apparent that hook 163 of locomotive 157 has already snatched the loop 161 from flexibly mounted clips 170—or the like— of the standards 158 (the latter having already automatically retracted into skin-grooving therefor, as explained co-pendingly), according to the procedure commonly followed, in general, for carrying out glider pickups. Whereas, however, in the pickup of stationary gliders, it is customary to place the glider craft in an offset location to the normally immobile ground station poles, the embodied standards 158 on the moving aircraft 1a enabled locomotive 157 to fly directly over the burden. This is important in such assisted take-offs, as well as in the glider launchings hereinafter given, where cross-wind mechanisms are employed on narrow, one-way strips, and particularly if catapulting means is to be additionally utilized. That is, the aircraft to be launched should maintain a substantially straight course along the runway for the full length of its preliminary run; and prior to its take-off, locomotive 157 will facilitate such action by maintaining a correspondingly even flight path relative to said runway.

In the drawing, the preliminary speed of craft 1a—if self-propelled—whether or not catapult assisted, greatly simplified the accurate engagement between hook 163 and loop 161 at relatively high locomotive speeds, and without imposing undesirable initial stresses upon any of the pickup and towing elements; that is: inclusive of the automatic shock winch 164, dolly 166, cable 165 and the loop 161 forming the terminal of loop-line or leader 169. It is to be noted, at this early stage, that locomotive 157 has only begun to pay out cable 165 through dolly 166 and that the latter is still securely anchored at an area desirably contiguous the lower static and/or aerodynamic center of balance of plane 157, whereby to prevent unstabilizing the latter; and this is equally true with respect to craft 1a except that, at this stage of the launching, leader 169 is presumed to be securely, releasably, held by hook 180 of the upper control-tongue 179, as was previously explained in connection with the hypothetical cable 184 of Fig. 3—the latter element in the present illustration, being an equivalent of leader 169.

In short, the initial pull against hook 180 has the added function of holding wheels 5 and 6 in a substantially true travel path along the runway, contrary to the direction of the cross-wind, while permitting the wings and fuselage to veer partially around to the windward side. Such a crabbed attitude is merely assumed in the side elevational view of Fig. 6, but is clearly visualized in Fig. 7.

The latter, incidentally, will serve to further clarify the respective positions of cowl 182 relative to right and left retracted standards 158, including a so-called loop-box 199 (see Fig. 9) which is not numbered in Fig. 7 but may be seen at the central area between the standards and immediately forward of the cowl. The storage utility of box 199 is largely self-evident but details thereon are not given since fully explained in said Patent No. 2,639,109.

Boom 162 is not shown in Fig. 7 but dolly 166 therein indicates the forwardmost area of tension on cable 165. The cross-wind 4 is assumed to be blowing substantially at a right angle to the runway, which latter is here but generally indicated by the respective lines of travel 201 of the main wheels 5.

If locomotive 157 was supplemented by catapulting means, such as by electropults 3 and 93 of Figs. 2 and 5, it is obvious that the cable 18 would be normally disconnected at one of its ends at the time of take-off, according to any of the options heretofore given. Until actual take-off, however—if full benefit is to be had from the cross-wind mechanism—aircraft 1a would be towed at rapidly accelerated speeds from hook 180.

As plane 157 must be traveling at faster speeds than the electropult launcher and its burden, whereby to overhaul the latter and impart a final surge of catapulting force thereto, it will of course be necessary to carefully predetermine the preliminary speeds of locomotive 157 relative to the starting time and acceleration of the launcher.

Needless to say, take-off will occur automatically at that area where the combined power of motors 156 and the tension on cable 165 will be such as to impart the required launching speed to craft 1a.

At any time thereafter, aircraft 1a (if a self-propulsive airplane) can be cast off from the locomotive 157 by the simple expedient of operating pull-cord 185, Figs. 3 and 11, whereby to open hook 180 to release the anchored end of leader 169, as similarly exemplified by cable 184 bearing the terminal 183. Such a composite launching method has the advantage of not only expediting the take-off of large, heavily loaded aircraft from relatively short runways, but, with the co-action of the cross-wind auxiliaries, it becomes possible to regularly carry out such operations by utilizing a single electropult installation—the wind component being thereby rendered relatively immaterial.

*Glider techniques*

Of equal advantage is the ability to land and to launch commercial glider crafts on and from brief one-way airstrip runways, wherein such gliders are equipped according to aircraft 1a but, in addition thereto, are also adapted to be towed in the usual preferred manner on long journeys: in short, from tow-line take-off points well forward of their centers of balance and, in general, from areas at or relatively close to the nose end of the gliders. Operations of this character are readily possible in accord with the sub-apparatus featured in Figs. 9, 12, 13, 14 and 15. Thus, too, if it be now assumed that aircraft 1a of Figs. 6 and 7 is a towable glider—instead of an airplane having hypothetical wing motors 156—it is readily seen how, by quickly switching the take-off point of the leader 169 from hook 180 to any predetermined forward position, as indicated, for instance, at take-off area 171, said leader can become one segment of a composite tow-line in conjunction with cable 165. See positions 169'—165'. Such a switching operation is made possible in at least a duality of ways.

According to one simplified arrangement, the loop-line, including leader 169, can have two distinct take-off points; namely, a first take-off point from which the aircraft is initially towed—as during a launching operation, for example—and a second take-off point from which the craft can be towed over the long hauls. This is accomplished by making one of the take-offs the location of a cable-release mechanism, from which the glider is to be eventually cast off—such as adjacent its upper center of balance—and the other take-off in the general area of the glider nose, where the leader is only temporarily secured, as by suitable snubbing means, and from which it is doubled back upon itself to the approximate location between embodied standards 158, for example, where the loop section 161 can be compactly stored within a box 199 until required for pickup duty.

The doubled strands of the leader are, in the meantime, conveniently snugged within a form-fitting skin-groove therefor (not shown) intermediary of the first and second take-off points; from which groove first the upper of said strands and then, subsequently, the lower thereof is stripped out and utilized in the manner explained. When finally relinquished at the cable-releasing point—which same could be either at an inboard winch or a simple cable-anchoring and releasing mechanism, at or adjacent the aircraft skin, utilizing a cam-lock pin 41, as a typical illustration—the loop-line in its entirety is normally cast off from the burden and reeled in by the locomotive.

In the present system, however, wherein cross-wind gear is to be used in connection with the launching run, it is obviously necessary to reverse the order of procedure whereby the first of the aforesaid take-off points is desirably adjacent the upper center of balance and/or the center of rotation—but, in any event, the location of hook 180 as explained relative to Fig. 3. Moreover, as will be more clearly understood shortly, it is unnecessary to fit a doubled back length of the leader into said groove; and unless it is desired to maintain such tackle in airborne storage relation, for later duty, the skin grooving could be omitted. That is, a rig-up could be made at the airport just before each launching. Thus, assuming the final take-off point to be area 171 in Fig. 6, from which the aircraft will be towed for the long haul and at which, or through a suitable outlet means at which location, the loop-line will be eventually relinquished, the other, initial take-off would be at said hook.

In order to deliver adequate bridle or wagon-tongue action through hook 180 and arm 179 to the lever-group 11, it is also necessary to attach the leader 169 non-slidably to—and not slidably through—the hook with sufficient temporary play at that particular area to permit all required lateral movement of arm 179 to one side of cowl 182 or the other, as determined by the wind direction, and whereby tow-line pull is directly from the hook. Such an attachment may be very quickly performed manually at the ground station before launching—utilizing any suitable temporary droppable fastener therefor or, for instance, an inset link 202 of Fig. 14, which is largely self-explanatory.

According to this version, then, the loop-line, including leader 169, could be initially dependent from a cable-release at area 171, and thence carried through a skin groove 172 (or without benefit of such a groove) to hook 180 as aforesaid; but, on being temporarily secured thereto, the brief remainder of the loop-line, which includes a loop 161, could be temporarily stored in a box 199, or, if a launching operation is immediately contemplated, said loop can be attached directly to standards 158 in their erect positions—as at clips 170 and any required additional break-out elements. When break-out takes place, the leader will of course revert immediately to the take-off area 171 for tow-duty and subsequent casting off.

It is sufficiently evident, from the foregoing data, that when such a loop 161 is later snatched from clips 170 by hook 163, the leader would establish a train of "wagon-tongue" control (for actuating the lever group 11) extending all the way from dolly 166 of plane 157 to hook 180, arm 179, and thence downward to said lever group through steering-column 174; and thence again to the rolling gear of the craft to be launched. Other features of the launching procedure, utilizing locomotive 157 only or plane 157 in coaction with a catapulting means, could be according to the technique already explained wherein aircraft 1a was assumed to be a self-propelled airplane.

This particular technique, however, in the case of gliders which are to be towed on long hauls, is preferably modified further, in that at any elected time after the glider has become airborne, dolly 166 may be unlocked at the location adjacent the lower center of balance of the locomotive and allowed to travel slotway 167 to location 168, which is presumably within or accessible to a tow-room at the rear of the fuselage nearby to winch 164. At such location, the composite tow-cable could then trail to the rear, as shown by phantom 165a.

*A further modification*

The somewhat simplified option just related is not, however, necessarily preferred. In fact, greater flexibility and mobility can be achieved wherein the glider to be launched is also equipped with a movable roller-dolly 166' and the latter adapted to be locked at the location seen in Fig. 9 adjacent loop-box 199 and cowl 182, or, as elected, moved along slotway 167' to hypothetical take-off point 171'; as see dolly phantom 166". Obviously, the take-off point could be any other preferred area along this slotway, the general location of which, in Fig. 6, may be likened to that indicated previously for skingroove 172.

Figure 14:
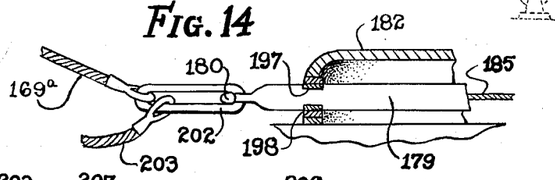
Fig. 14 is an enlarged fragmental, side-elevational exhibit of certain elements first shown in Fig. 3, in cooperation with adaptable aircraft tow-cable tackle, broken open to better illustrate particular features thereof.
Figure 15:
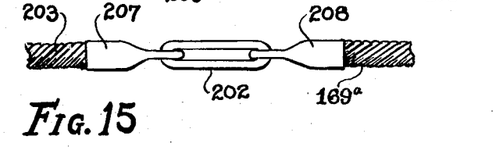
Fig. 15 shows how the coupling components of Fig. 14 will automatically orient themselves when the respective sections of tow-cable connected thereto become taut.

The structure of Fig. 9 is but further slightly modified by provision of the briefly mentioned linkage arrangement of Figs. 14 and 15. In short, cowl 182, arm 179, hook 180 and steering column 174 may be as shown in Fig. 3. But in this assembly, Fig. 9, it has been conveniently assumed, by option, that the leader 169a is connected by link 202, Figs. 14 and 15, to the auxiliary glider-borne tow-cable 203—position 203' adjacent dolly 166'—having been carried from a winch-drum 204, through suitable snubbers 205 or the like and over a required plurality of sheaves 206 to the dolly at the upper location shown. As previously explained according to the first mentioned option, a very brief length of slack-line, as at area 203' of cable 203, is required to permit ample lateral movements of arm 179; hence the linkage of Figs. 14 and 15.

In brief, the centermost link 202 has the slenderized configuration of the drawing, whereby its width is preferably no greater than the terminals 207—208, Fig. 15, when extended in the manner shown. This enables the entire coupling to be reeled in or unspooled back or forth, as required, to and from drum 204 through the central freeway of the dolly when the latter is at position 166'', whereby a relatively straight-on line of tension may be created through the dolly to the top of the drum, for example, according to this particular schematic. Hence, in the preliminary make-ready or rig-up, link 202 can be inserted over the mandible or beak of hook 180 approximately as indicated, so as to create said brief area of slack-line in cable 203; but as soon as the composite line is released under tension from hook 180, all elements of the coupling will automatically orient themselves according to Fig. 15.

In practical operation, the looped end of leader 169a, having been stored within loop-box 199, would be removed therefrom manually or automatically, so as to releasably support said loop from clips 170 of the standards 153 (not shown in Fig. 9) in the path of snatch hook 163, just as was previously explained. And leader 169a would remain connected to hook 180, Fig. 14, throughout the launching run in order to exert tow-line pull against arm 179 for steerably controlling the glider while permitting its wings and fuselage to partially swerve to windward.

After the take-off, pull-cord 185 may be operated to release the composite tow-line, as explained, with the linkage straightened out according to Fig. 15. Dolly 166' may then be unlocked and allowed to be automatically pulled forward to position 166'' and the leader line 169a, which, in this modification, is also the drum-line, oriented to position 169b. As mentioned in relation to previous options, catapulting means could, as elected, be utilized to assist locomotive 157 in rapidly launching the glider, thus also enabling the locomotive to engage it at relatively coordinated speeds.

While at least one preferred method of launching gliders against a cross-wind from short one-way airstrips has been given, it is obvious that where the length of the runway would permit, standard procedures could be followed for launching a plurality of stationarily disposed gliders, when so equipped; as also see, for example, Patent No. 2,402,918 to Arthur B. Schultz entitled "Glider Launching System." Alternatively, locomotive 157 could pick up several gliders, one after another, each of the respective glider lines being transferred consecutively to separate towing drums in the tow-room. The detailed means for carrying out such a transfer operation are given in said Patent No. 2,639,107.

Fig. 12 illustrates possible other techniques. While primarily illustrating one of sundry methods of landing gliders on one-way strips against the cross wind 4, it is apparent that a locomotive plane 157 connected by tow-lines 200 to the gliders 1b, 1b, 1b and itself (as momentarily assumed) towed by a catapulting device 21, could readily be launched in an entrained fully airborne relation to these gliders immediately after the take-off of the latter aircraft; it being also assumed that each of said craft, as well as the locomotive, bears the requisite cross-wind tackle thereon.

Thus, before launching, the gliders would be towed from respective control-tongues 179, protruding from cowls 182, whereby their rolling gear—by operating certain subsidiary mechanism on the steering columns to be explained shortly—could follow parallel tread paths while permitting the respective airframes to swerve partially to windward. After launching, the several units of the airtrain would then normally assume the slightly crabbed airborne positions indicated by plane 157 and the glider fuselages 209, 209, 209, tow-lines 200 having become oriented to the forward take-off points according to phantoms 200'; that is, after each of a triality of dollies 166', for example, had traveled along slotways 167' to the approximate areas indicated at said take-offs.

It is, however, evident that whereas the heading of the centermost glider is in the same direction as the heading of plane 157, the gliders at right and left are so spaced from the line of travel of the locomotive that the cables 200 connected to these gliders are in sharp angular inclinations to the common longitudinal axes of said first glider and the locomotive. Ordinarily, such a preliminary disposal of the right and left gliders would tend to nullify the benefits to be derived from the cross-wind tackle thereon, since it is evident that so-called wagon-tongue action, through their respective arms 179 and steering-columns 174, would steerably pull them inwardly toward each other—and toward the centermost glider—thus doubtless producing a severe collision therebetween. Irreversibly pre-setting and locking their rolling gear, however, in the manner explained in well known patents of the prior art, would be undesirable for the same obvious reasons referred to earlier and co-pendingly in respect to other aircraft when so equipped and operated. The undercarriage should, by preference, be free to describe such minor weaving movements as may be momentarily caused by sudden gusty ground currents, inasmuch as these are cancelled automatically without unstabilizing the aircraft.

The difficulty is fully provided for in Fig. 4. In brief, wherein towable gliders are to be operated according to Fig. 12—that is, fanwise—or, for another example, wherein a plurality of relatively small self-propelled airplanes are to be simultaneously assisted at take-off by a single catapult launcher according to the launching method of Fig. 12 (but assuming, in that case, that cables 200 would be thence quickly cast off), the control column 174', Fig. 4, is comprised of an upper section 174a and a lower section 174b. According to this option, section 174b is integrally carried from the composite lever member 11, and the somewhat larger section 174a is fitted thereover for limited rotational movement relative to the lower section. That is, the lower section, in this particular view, carries a bracket including the helical worm 233, which engages the complementary geared member 234; the latter being splined or otherwise integrally locked about the lower end of upper section 174a substantially as shown.

It is apparent that the upper section can be given any desired predetermined setting by a very brief turn of crank arm 235; so that, unless or until a different setting is made, the respective upper and lower sections of column 174' will be rotatively actuated in unison by the wagon-tongue motions of arm 179—as previously explained in relation to column 174 of Fig. 3; thereby master-controlling the rolling gear through lever group 11. Obviously, the lower section could be the larger; the bracket supported worm 233 could be carried from the upper section to engage complementary gear member 234 on the lower section; and various other equivalents—such as jaw-clutches, et cetera of well known types—could be substituted within the breadth of the means here shown. If desired, crank-shaft 236 could be terminated, on the right hand side of the bracket assembly, with a pointer (not shown) adapted to register the exact angle of the setting effected by each turn of crank 235—either to the right or the left—according to markings upon a suitable dial plate carried on the adjacent outer face of said bracket. Obviously, the dial and the pointer could, by option, be on the side nearest the crank-handle.

According to another option, the worm 233, for movements relative to geared member 234, could be motor-driven and the servomotor therefor actuated by remote control.

Phantom 237 of Fig. 11 indicates one relatively extreme angular pre-setting of the arm 179, according to the arrangement of Fig. 4.

*Cross-wind glide landings*

Fig. 12 also illustrates one method according to which each of the three gliders could be landed coincidentally, by expert piloting. In brief, and assuming now that all four of the aircraft are airborne, and in only normally crabbed attitudes according to phantoms 123 and 209, plane 157 could follow a straight course over the centermost standards 88—88, having ground loop 210 suspended therebetween and thence connected to a subway landing dolly 211. The right and left gliders 1b, however, arriving first in this fan formation, and each bearing landing booms 13, for example, and hooks 14, would snatch the loops 210′ and 210″ from standards 88′ and 88″ as indicated, whereby to thus engage dollies 211′ and 211″ for deceleration according to the landing method briefly related in connection with Fig. 8. Similar action would occur an instant later between the centermost glider and said first dolly 211. The remainder of these triplicate landing operations would thence take place automatically, in the general manner explained earlier.

Needless to say, however, at this juncture all three of the gliders must cast-off the respective lines 200 for the retrieval of the latter to individual tow-drums, for example, on plane 157. Such an operation must be quite automatic and instantaneous, and the same is additionally provided for in the apparatus of Figs. 3 and 4.

Hence, in Fig. 4, the piston rod 65 could have an upstanding pin 212 adapted to engage the spring contactshoe 213, but only when rod 65 is pulled slightly forward from shock cylinder 66, such as would quickly occur upon engagement of hook 77 with loop 84 (loops 210, 210′ and 210″ of Fig. 12) an instant after it became disconnected from boom 72—as at phantom 214. Such action would also instantaneously close the circuit represented by conductors 215 and 215′ and battery 216, thereby simultaneously actuating solenoid 217 to operate lever-arm 218 of schematic cam-lock 219 for release of a cam-lock pin 41a, the latter anchoring the tow-cable 200 to one of the gliders 1b, Fig. 12.

It is apparent, wherein a detachable hook 77 is employed, the latter would be freed from the end of boom 72 by the initial force of the "strike" against the predetermined strength of the break-out clips, and before each of the loops could shortly thereafter assume momentary loosed configurations as at right and left in Fig. 12, following break-outs from the station poles. That is, before the loops had become taut and at tension from the subsurface dollies 211′ and 211″, for example, the cables 200 previously connected to the gliders—as by pins 41a of Fig. 4—would already have been released from the two forwardmost of the same; and, in this manner, allowing each of the gliders to complete an independent landing and deceleration according to the general technique first mentioned in connection with Fig. 8.

However, as the boom 13 of Fig. 3 was used, hypothetically, on the gliders 1b of Fig. 12, it may be said that substantially the same automatic release of cable 200 therefrom could be similarly effected in various ways which will now readily occur to operatives of the related arts. For illustration, hook 14 could be provided with a small inner trigger 219′ adapted to actuate a switch 220; the latter having suitable electrical conductors carried through the shank of boom 13, indicated by arrow 220′, to any suitable cable-release mechanism comparable, for example, to cam-lock 219. Further details of such an arrangement need not be given herein, as said skilled professionals will readily be able to provide the required detailed assembly by reference to the patent to R. O. Anderson, No. 2,359,275 entitled "Load Pickup Device," wherein a plurality of similar mechanisms is disclosed; as especially see Fig. 4 of said last named patent.

Alternatively, of course, the gliders could be individually towed into engagement with the ground loops, plane 157 making three separate flights over the station poles and each time relinquishing one of the gliders. Thus, in Fig. 13, one of sundry possible means for landing a single glider 1b could include the specialty boom 13a having a hook 14a mounted slightly above the end of this boom within a fork or yoke 221. Boom 13a also has the wheel 222 adapted to make initial contact with surface 2 and to thereafter automatically actuate the flight controls of the glider, through autopilot group 223; thereby causing glider 1b to maintain an exact distance above said surface until hook 14a, moving just below line 224, engages the ground loop 225 having an upper cross-cord suspended between break-out clips 226 on a duality of right and left midget standards 227.

Loop 225 has the leader 228 adapted to be freely slidingly carried through an annular ball-bearing fixture 229 and thence through twin-sheaves 230 or the like to subsurface winch 231. Beam-emitting "local homes" 232 and 232′, so-called, are positioned for further guiding coaction with the automatic pilot and flight control group for assuring accuracy of engagement between hook 14a and loop 225. It is not here intended—in Fig. 13—to introduce a new species of landing station apparatus, since a variantly different but broadly comparable installation is sufficiently disclosed, in greater detail, in the co-entered application called Landing and Launching System For Aircraft, Serial No. 23,646, but merely to indicate that this arrangement—or any serviceable equivalent thereof—may be employed for landing each of the gliders 1b of Fig. 12 separately or coincidentally.

I now claim:

1. In a launching and towing system for aircraft, the combination including: a towable aircraft to be launched at an oblique angle to a brisk cross-wind; an airborne towplane; a catapulting device; a towing cable interconnecting said towable aircraft releasably to said catapulting device; a spaced duality of spar members extending upwardly from right and left supports therefor on the respective wings of the towable aircraft; a burden line formed at one end portion thereof as a closed loop; means on said spar members to which and between which a stretched portion of said loop is releasably attached; loop-engaging means, in structure with aircraft towing auxiliary means, extensible from said towplane in a position to snatch said loop from said spar members; an undercarriage on said first aircraft, including a plurality of steerable landing gear wheels; a rudder on said same aircraft; means, incorporating master aircraft-steering mechanism, interconnecting said wheels with said rudder for coordinated movements therebetween, said aircraft-steering mechanism comprising a primary transmission member to which the respective rudder and wheel coordinating means are connected, and through which they are master actuated for exerting simultaneous subsidiary actuative movements; an upright member integral with the upper side of said primary transmission member, and adapted for limited co-rotative movement therewith, said upright member having an upper portion which extends through an opening therefor formed in the upper side of the aircraft fuselage wall structure; a bearing element, within which said upper portion of said upright member has limited clockwise and anti-clockwise movement; a lever arm having one end thereof secured to the outboard terminal portion of said upright member, the freely disposed opposite end of which lever-arm bears a terminal to which the end of said burden line—remote from said loop portion thereof—is releasably attached, and through which terminal varying orders of clockwise and anti-clockwise movement is transmittible from the burden line to said upright member and, therethrough, to said primary transmission member; and auxiliary other means for imparting steerable movement to said primary transmission member and, therethrough, to said rudder and landing gear wheels, said auxiliary means comprising: an outboard element carried from the underside of the fuselage of said towable craft, and to which outboard element a section of said towing cable, remote from its connection at said catapult, is entrained; means being provided by which said outboard element is, in turn, co-rotatively interconnected to the underside of said primary transmission member, whereby to complete a unitary train of aircraft steering means operable simultaneously from the respective towplane and catapult components against said primary transmission member, through each of said first outboard lever arm and said last named outboard element.

2. In a launching system, the combination including: an aircraft to be at least partially catapulted from a launching surface in angular relation to the side thrust of a cross-wind; catapulting mechanism associated with said surface; a steerable undercarriage on said craft; a rudder thereon; means by which said undercarriage and said rudder are operably entrained for coordinated movements; and other means, including an aircraft towing element, which releasably interconnects said catapulting mechanism to said undercarriage and rudder coordinating means of the aircraft.

3. In combination: an aircraft to be launched in angular relation to the side thrust of a cross-wind; catapulting mechanism for coaction with said craft; an undercarriage therefor; means, including transmission means, enabling the aircraft main body to automatically assume a crabbed attitude in the presence of said cross-wind, in misalignment with the heading of said undercarriage incidental to its acceleration by the catapulting mechanism; and means releasably, towably, interconnecting said transmission including means of said craft to said mechanism.

4. In an aircraft, the combination including a plurality of steerable undercarriage elements; a rudder; means, comprising a master transmission device, controllably interconnecting said undercarriage and said rudder for coordinated movements; and other means, including a length of tow cable, enabling the master transmission device to be indirectly entrained to a catapult.

5. In combination: an aircraft to be catapulted, rollable undergear on said craft, means thereon for steerably controlling said undergear, a catapult, and means releasably, towably, interconnecting said undergear controlling means of the aircraft to said catapult to complete a train of aircraft steering mechanism operable from and by the catapult.

6. In an aircraft to be launched, the combination, with a steerable undercarriage on said craft and steering-control mechanism entrained therewith, of means including a cable-release element for towably, steerably, releasably interconnecting said steering-control mechanism of said craft to a locomotive airplane.

7. In an aircraft to be successively landed on and launched from a landing and launching surface, the combination, with steerable undercarriage elements, which further includes: a primary transmission member; subsidiary transmission members associated with said undercarriage elements for imparting steerable action thereto simultaneously; means interconnecting said primary transmission to said subsidiary transmission members for actuation of the latter by the former; and means in plurality by which said primary transmission is itself actuated, whereby to impart transmitted actuating movement to said subsidiary transmission members to steerably control said undercarriage elements in respect to a landing operation, in one relation, and, in another relation of said primary transmission and said craft, in respect to a launching operation; the landing assisting component of said plural means comprising a line-snatching element operable for coaction with aircraft engaging and decelerating means at a landing surface, and the launching assisting component thereof comprising means for enabling said aircraft, including said primary transmission, to be towably entrained to a catapult; other means being provided to idle the respective said landing or launching assisting components to free the other thereof for unimpeded coaction with said primary transmission as required.

8. In an aircraft, the combination including: steerable undercarriage elements; an inboard master transmission assembly having a plurality of steering components in structure which interconnect said transmission assembly with each of said undercarriage elements; an outboard member, co-rotatively entrained with said master transmission assembly, operable to transmit steerable movement thereto and therethrough to said undercarriage elements; and means on said outboard member for effecting its releasable engagement to an aircraft towing and launching device.

9. In an aircraft, the combination including: steerable undercarriage elements therefor in spaced positions; a master transmission device; means remotely interconnecting said transmission device with said undercarriage elements, for imparting steerable movements thereto through said transmission component; and means—including a length of retractable towline—by which said master transmission device is adapted—to be remotely entrained to and actuated by an aircraft launching means.

10. As a new element for aircraft, in combination: a control-pan; said control-pan comprising an externally streamlined member, pivotally carried for limited lateral movements adjacent the lower side of the aircraft fuselage, and from an element connecting it co-rotatively with a master transmission group inboard said fuselage, which group includes a primary transmission means having subsidiary mechanism interconnecting it steerably to the aircraft undercarriage; said pan bearing means by which it, in turn, is releasably, towably, connectable to a catapulting device.

11. As a new element for aircraft, in combination: a control-tongue; said control-tongue comprising a lever-arm co-rotatively carried, in an outboard location, from one outwardly protruding end of an upstanding inboard member and the latter, in turn, integrally carried from a master transmission group, said group including a primary transmission means having subsidiary mechanism interconnecting it steerably to the aircraft undercarriage, and to which primary transmission the lower end portion of said upstanding member is non co-rotatively secured; said control-tongue having a cable-release means at one freely disposed end thereof.

12. In a towable aircraft, the combination including: a cable-release mechanism from which a length of tow-cable is adapted to extend and to interconnect said craft with a locomotive plane; means, including a line-engaging element on said towable craft for enabling it to make contact with landing and decelerating instrumentalities therefor at a surface station; an electrically wired circuit; and circuit-closing mechanism, in structure with said line-engaging means, operable through said circuit to instantaneously actuate said cable-release mechanism responsive to the contact of the line-engaging means with said surface instrumentalities.

13. The combination between a towplane and a towable glider craft, wherein at least the glider component has means in structure for steerably controlling the directional heading of its undercarriage elements along tread paths frequently oblique to the longitudinal axis of its fuselage while traveling a runway surface; said combination further including a tow-line interconnecting the undercarriage steering control means of said glider to said towplane, in one relation, together with auxiliary other means for electively disconnecting said tow-line from said steering control means and for shifting the burden-bearing end of the line element thence to a take-off point on the glider normal thereto for range towing.

14. In an aircraft having undercarriage elements and means for steerably controlling the heading of said elements along parallel tread paths frequently diagonal to the longitudinal axis of the aircraft fuselage while traveling a runway surface, that modification wherein the steering control means includes a master transmission device; wherein subsidiary transmission devices are connected to each of said undercarriage elements; and wherein means are provided for the transmission of steerable movement from said master device to said subsidiary devices; said master device being interconnected in train to an outboard member from which it receives steerable actuation, at different times, in respective launching and landing relations of the aircraft, the outboard member per se having a forwardly disposed portion from which it may be towably engaged to a catapult and a rearwardly disposed portion which cooperates with surface tackle complementary thereto at a landing station; said forwardly and said rearwardly disposed portions being at respective locations fore and aft of the center of rotation of said aircraft.

15. In an aircraft, the combination including a fuselage, an undercarriage, undercarriage steering means, and an outboard lever-arm capable of rotative movement relative to the longitudinal axis of said fuselage; said arm being carried from means interconnecting it with said undercarriage steering means, and provided, at one end thereof, with a cable-release mechanism.

16. In an aircraft, the combination including a plurality of steerable undercarriage elements, an outboard member interconnected to said undercarriage elements for imparting steerable movement thereto from outside the main aircraft casing wall means, and means, in structure with said outboard member, by which said aircraft may be hitched to a towing and launching means.

17. The combination between a towplane and a towable glider craft, wherein at least the glider component has means in structure for steerably controlling the directional heading of its undercarriage elements along tread paths frequently oblique to the longitudinal axis of its fuselage while traveling a runway surface; said combination further including line means interconnecting the undercarriage steering control means of said glider to said towplane.

18. In an airplane, the combination which comprises an undercarriage, undercarriage-steering mechanism in structure, means extensible from said plane in a position for its engagement with airplane-arresting tackle at a landing station, and other means indirectly interconnecting said undercarriage—through the agency of said undercarriage-steering mechanism—with said extensible means.

References Cited in the file of this patent

UNITED STATES PATENTS

| Number | Name | Date |
|---|---|---|
| 514,527 | Wauters | Feb. 13, 1894 |
| 892,454 | Ronstrom | July 7, 1908 |
| 1,281,898 | Benson | Oct. 15, 1918 |
| 1,629,767 | Valdes | May 24, 1927 |
| 1,747,344 | Bell | Feb. 18, 1930 |
| 1,747,583 | Hadden | Feb. 18, 1930 |
| 1,749,357 | Schmelz | Mar. 4, 1930 |
| 1,786,649 | Gonzales | Dec. 30, 1930 |
| 1,789,653 | Hoyt | Jan. 20, 1931 |
| 1,803,320 | Christianson | May 5, 1931 |
| 1,844,186 | Short | Feb. 9, 1932 |
| 1,850,490 | Bahl | Mar. 22, 1932 |
| 1,925,212 | Steiber | Sept. 5, 1933 |
| 2,125,904 | Fellers | Aug. 9, 1938 |
| 2,168,147 | Arehart | Aug. 1, 1939 |
| 2,222,850 | Maclaren | Nov. 26, 1940 |
| 2,240,947 | Wilson | May 6, 1941 |
| 2,263,805 | Haddon | Nov. 25, 1941 |
| 2,366,892 | Donnellan | Jan. 9, 1945 |
| 2,371,635 | McClure | Mar. 20, 1945 |
| 2,373,236 | Effinger | Apr. 10, 1945 |
| 2,390,754 | Valdene | Dec. 11, 1945 |
| 2,395,405 | Goddard | Feb. 26, 1946 |
| 2,404,984 | Powers | July 30, 1946 |
| 2,418,702 | Du Pont | Apr. 8, 1947 |
| 2,452,618 | Weeks | Nov. 2, 1948 |
| 2,460,506 | Jamison | Feb. 1, 1949 |
| 2,486,418 | Jolly | Nov. 1, 1949 |

FOREIGN PATENTS

| Number | Country | Date |
|---|---|---|
| 292,826 | Great Britain | June 28, 1928 |
| 470,767 | Great Britain | Aug. 20, 1937 |
| 571,559 | Great Britain | June 27, 1939 |
| 844,295 | France | Apr. 17, 1939 |

OTHER REFERENCES

Popular Science Monthly, issue of March 1948, page 120.